No. 844,648.
PATENTED FEB. 19, 1907.
J. O. BANNING.
AIR COMPRESSOR.
APPLICATION FILED DEC. 18, 1905.
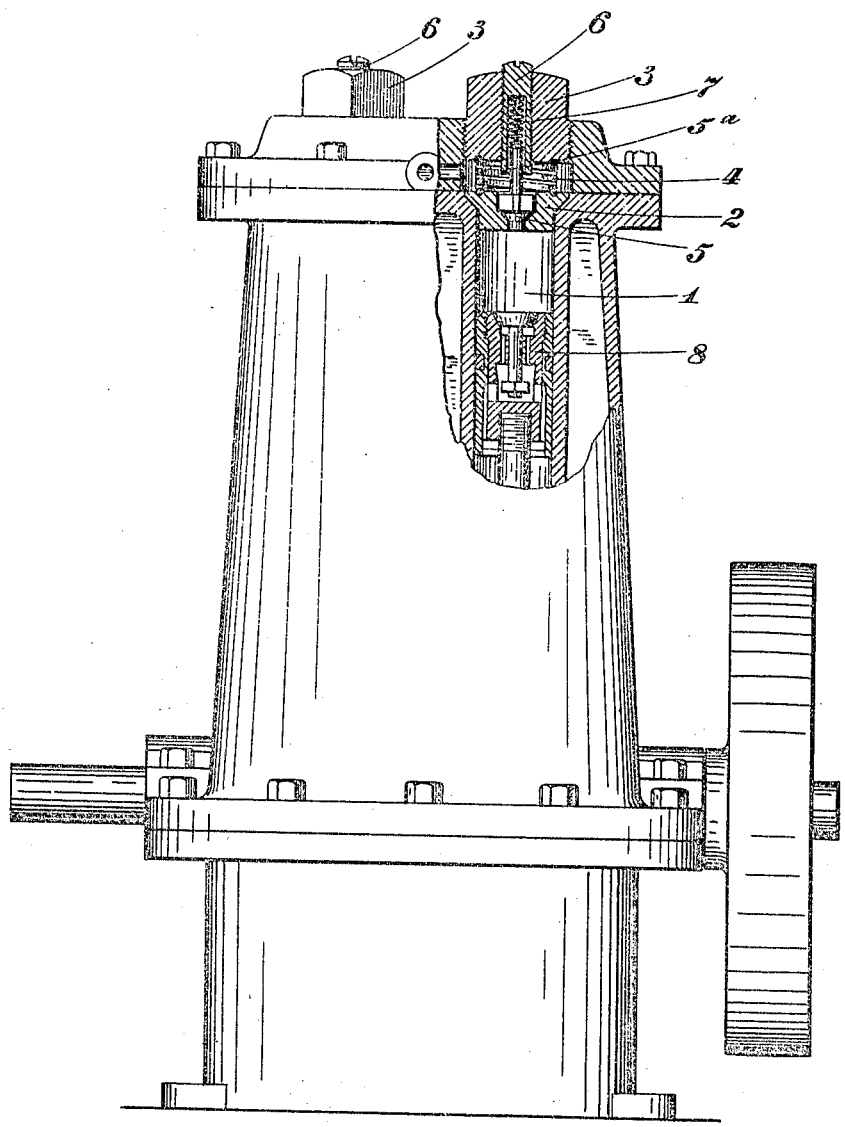
Witnesses
Benj. Finckel
Alice B. Cook
Inventor
Joseph O. Banning,
by Finckel & Finckel
his Attorneys

UNITED STATES PATENT OFFICE.

JOSEPH O. BANNING, OF ZANESVILLE, OHIO.

AIR-COMPRESSOR.

No. 844,648.  Specification of Letters Patent.  Patented Feb. 19, 1907.

Application filed December 18, 1905. Serial No. 292,329.

*To all whom it may concern:*

Be it known that I, JOSEPH O. BANNING, a citizen of the United States, residing at Zanesville, in the county of Muskingum and State of Ohio, have invented certain new and useful Improvements in Air-Compressors; and I do hereby declare the following to be a full, clear, and exact description of the invention, such as will enable others skilled in the art to which it appertains to make and use the same.

The object of this invention is to provide an improved valve for air-compressors, said valve being of the compound type.

The invention consists in the construction hereinafter described and claimed.

In the accompanying drawing, showing an embodiment of the invention, the view illustrates in elevation a double-acting compressor in which the compression-chamber, the valves, and the companion piston are depicted in vertical sectional view.

In said view, 1 designates the air-compressing chamber. 2 is the larger valve, which is equal in diameter to the diameter of the chamber and fits in an appropriate seat in the upper end thereof. 3 designates a cap or nut threaded into the head of the cylinder above the valve 2. Between the lower end of the cap or nut 3 and the upper side of the valve 2 is secured a strong helical spring 4. The upper side of the nut and the upper side of the valve can be grooved to afford seats for the end coils of the spring 4. By adjusting the nut 3 the pressure of the spring can be made greater or less, and therefore the pressure of the valve on the seat correspondingly varied.

The valve 2 is made with a central port and seat, upon which latter is seated a smaller valve 5, having a stem 5ª. Threaded through the center of the nut or cap 3 is another smaller nut 6, having its lower end bored axially to form a cavity into which the stem of the smaller valve projects and by which it is guided. Within the bore of the smaller nut 6 and above the end of the stem 5ª is a coil-spring 7, that presses down on the stem, and therefore holds the smaller valve in its seat in the larger valve 2. By adjusting the smaller nut 6 the pressure of the spring 7 can be made greater or less, and therefore the pressure of the smaller valve 5 on its seat correspondingly varied. Both the nuts 3 and 6 are adapted to be turned by an appropriate tool. For instance, the larger one can be turned with a wrench and the smaller one with a screw-driver.

It will be observed that although the turning of the larger nut without readjustment of the smaller nut affects both the springs, yet the pressure of the two valves on their respective seats is nevertheless capable of independent regulation, and that, too, without removing either of the nuts from the head of the machine. The advantage of this capacity for independent regulation is that the larger valve may be set for the maximum of compression desired, which compression varies according to the purposes for which the compressed fluid is to be used and according to the strength of the vessel to contain such compressed fluid. If the pressure of the larger valve on its seat is varied, the pressure of the small valve on its seat should be suitably varied to permit it to properly respond to the pressure generated in the compression-chamber.

In practice the stroke of the piston, which is designated 8, is made such that it nearly or quite reaches the larger valve, and so forces the more highly compressed air immediately under it into the chamber above the valve.

What I claim, and desire to secure by Letters Patent, is—

1. In a fluid-compressor, the combination of a fluid-compressing chamber, a piston therein, and two valves for said chamber one of which is provided with a port and seat to receive the other, independent springs to press on said valves, and two threaded nuts one within the other to press, one on one of the springs, and the other on the other of the springs, whereby the pressure of said valves on their seats may be independently regulated.

2. In a fluid-compressor, the combination of a fluid-compressing chamber, a piston therein, and two valves one of which is provided with a port and seat to receive the other, independent springs to press on said valves, and two nuts one within the other for pressing on said springs, said nuts being independently and externally adjustable to regulate the pressure of the springs.

3. In a fluid-compressor, the combination of a fluid-compressing chamber, a piston therein, a valve 2 for said chamber provided with a port having a valve-seat, a second smaller valve 5 on said seat, an adjustable threaded cap or nut 3 to close the chamber beyond said valves, a single coiled spring 4 encircling the valve 5 and located between the said cap or nut and the valve 2 and pressing on the latter, an adjustable nut 6 threaded centrally into the cap or nut 3, and a spring 7 located between said nut 6 and the valve 5, said cap 3 and nut 6 being operative for adjustment at the exterior of the chamber.

In testimony whereof I affix my signature in presence of two witnesses.

JOSEPH O. BANNING.

Witnesses:
   ULYSSES R. PETERS,
   GEORGE M. FINCKEL.